March 13, 1928. 1,662,603

W. C. FERGUSON

PIPE JOINTING ELEMENT

Filed Oct. 22. 1926

INVENTOR

William C. Ferguson

BY Bakewell & Church

ATTORNEYS.

Patented Mar. 13, 1928.

1,662,603

UNITED STATES PATENT OFFICE.

WILLIAM C. FERGUSON, OF ST. LOUIS, MISSOURI.

PIPE-JOINTING ELEMENT.

Application filed October 22, 1926. Serial No. 143,386.

This invention relates to joints for sewer pipe and water pipe of the bell and spigot type.

One object of my invention is to provide a pipe jointing element, constructed either in the form of an annular gasket or a strip that can be bent into annular form, which can be installed quickly and easily to produce a tight joint between a pipe spigot and its co-operating bell.

Another object of my invention is to provide an asphaltic pipe jointing element which is of such construction that it can be installed easily and in such a manner as to produce an absolutely tight joint, notwithstanding the fact that the element is stiff enough to effectually resist the possibility of its squashing down when subjected to the weight of the earth that is used to cover the pipe with which said element is used.

Another object of my invention is to provide a pipe jointing element that will adapt itself to a very wide range of shapes and sizes of pipe and which can be used to produce a tight joint, even with pipe that are badly deformed or considerably out of shape.

Another object is to provide a jointing element for bell and spigot pipe which does not depend for its efficiency upon squeezing the element between the end of the spigot and the seat or inner end wall of the co-operating bell.

And still another object of my invention is to provide a pipe jointing element that is easy to install and which is of such construction that it will not only be packed tightly in the annular space between the spigot and bell of the two pipes with which it is used, but will also adhere tightly to the pipe. Other objects and desirable features of my invention will be hereinafter pointed out.

To this end I have devised a pipe jointing element which is of such construction that when it is positioned at the front end of a pipe bell in engagement with the end of the co-operating spigot, the inward movement of the spigot into the bell will cause said element to be rolled into the bell and spread over the inner surface of same, thus filling the space between the bell and spigot. The shape of the jointing element can be varied without departing from the spirit of my invention, but it is preferable to make it of such cross-sectional shape that when it is positioned at the front end of the bell preparatory to forcing the spigot home, i. e., into the bell, a portion of the jointing element will be arranged in engagement with the front edge of the bell on the outside of the bell, so as to constitute a reserve supply of packing material, more or less of which will be fed into operative position between the inner surface of the bell and the outer surface of the spigot, depending upon the size of the annular space between the spigot and the bell, when the spigot is forced home or moved endwise into the bell. By constructing the jointing element in this manner I am able to reduce the number and different sizes or shapes of jointing elements that have to be kept in stock and at the same time I obtain a jointing element that will produce a perfectly tight joint, even when used with pipes that are not uniform as to shape and dimensions, and pipes that are badly deformed and out of shape.

The portion of the jointing element just referred to, i. e., the part that contacts with the front edge of the bell and which is arranged on the outside of the bell at the beginning of the operation of installing the element, also acts as a shoulder or abutment portion on the jointing element that co-operates with the bell to prevent the element from slipping relatively to the bell when the spigot is forced home. It is also preferable to provide the jointing element with a similar shoulder or abutment portion that is adapted to be engaged by the front end of the spigot, so that when the spigot is being forced home, the jointing element will be subjected to pressure in such a way as to roll it into operative position between the outer surfaces of the spigot and the inner surface of the bell. The particular shape and dimensions of the abutment portion or portions of the jointing element are immaterial, but said element will usually be provided with a central portion of less thickness or cross-sectional area than the portions of the element which contact with the end of the spigot and with the front edge of the bell, at the beginning of the operation of installing the element.

I have herein illustrated my present invetion embodied in a pipe jointing element of the same general type as the pipe jointing element described in my U. S. Patent No. 1,608,470, dated November 23, 1926, i. e., a water-proof element formed from an asphaltic substance of such consistency that the element can be handled without losing its shape, but will deform and fill the space between the spigot and bell when subjected to pressure by the movement of the spigot into the bell. I wish it to be understood, however, that it is immaterial so far as my present invention is concerned, what kind of material is used to form the body of the jointing element, so long as said material is of such a character or nature that the element can be deformed and rolled into operative position between the bell and spigot, as previously described. Preferably, the jointing element is provided with an outer coating formed from a sticky, water-proof substance having great adhesive properties, so as to insure a good bond or water-tight joint between the jointing element and the pipe, thereby insuring a pipe joint in which the jointing element is packed tightly in the annular space between the spigot and the bell, and also connected by a sticky water-proof substance to the pipe. If the body portion of the jointing element is formed from an asphaltic substance which is of such consistency that it might disintegrate or separate during the operation of installing the element, said asphaltic substance can be surrounded by a fabric casing. My present jointing element produces a better pipe joint than the jointing element which forms the subject-matter of my patent previously referred to, and it is easier to install, owing to the fact that a relatively slight pressure will pack it tightly between the bell and spigot of the pipe with which it is used without danger of breaking or cracking the bell.

The new method that I have devised for joining bell and spigot pipe and which constitutes the subject-matter of my pending application for patent Serial No. 210,699, filed August 4, 1927, consists in arranging a deformable jointing element in a pipe bell at the extreme front end of the bell or at a point in advance of the rear end wall of said bell, or arranging said element in engagement with the front end of the spigot, and thereafter moving said spigot inwardly into the bell, so as to roll the jointing element into the bell and cause it to spread out into the form of an annular ring that fills the space between the inner surface of the bell and the outer surface of the spigot. In practising my method I prefer to use a jointing element of the kind herein described, but the particular construction of the jointing element is immaterial, so long as said jointing element has sufficient plasticity to enable it to be rolled into operative position by exerting longitudinal pressure on a portion at the inner side of said jointing element while a portion at the outer side of said jointing element is held against longitudinal movement.

The above method of joining bell and spigot pipe makes it possible to use a jointing element formed from a relatively stiff asphaltic substance, because the packing of the jointing element into the annular space between the spigot and the bell is effected by a rolling action and not by squeezing the jointing element between two surfaces arranged in abutting relation. In fact, with my present method it is possible to produce an absolutely tight, solid joint between two pipes with a jointing element formed from an asphaltic substance having a penetration of from 75 to 125. This is highly advantageous, as such a jointing element has sufficient inherent stiffness to eliminate the possibility of its squashing or crushing down when it is subjected to the pressure or load of the dirt that is used to fill in the trench which contains the pipe line in which the jointing element is installed. Accordingly, in practising my method I prefer to use a jointing element that is relatively stiff and which usually will be formed from an asphaltic substance having a penetration of from 75 to 125. I also prefer to use a jointing element which is of such cross-sectional shape that a portion at the front end of same which contacts with the front edge of the bell will be large enough to compensate for inequalities in the size and shape of the pipe with which the jointing element is used.

Figure 1 of the drawings is a longitudinal sectional view, illustrating a jointing element constructed in accordance with my invention, arranged in position in the end of a pipe bell, preparatory to moving the co-operating spigot into the bell.

Figure 1:
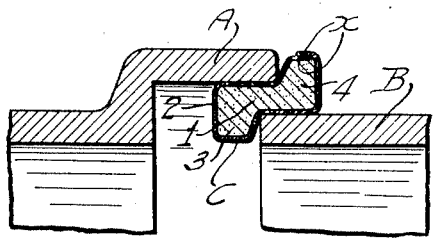

In the drawings, A designates the bell on one end of a pipe and B designates the spigot of a co-operating pipe that is adapted to be forced into said bell. The reference character C in Figures 1, 2 and 3 designates a jointing element representing one form of my invention that is composed of a plastic or semi-plastic, water-proof core 1 formed of an asphaltic substance or composition, and surrounded by an outer cover 2, formed preferably from a strip of cloth or other suitable fabric wrapped around the core with its end portions $x$ overlapped on the outer side of the element C, as shown in Figure 1. Said core is of such consistency that the jointing element will retain its shape in shipping, storage and when it is being handled in the operation of installing it, but will be capable of deforming and packing tightly into the space between the bell and spigot when subjected to the pressure that the spigot or the casing 2 exerts on same in the operation of forcing the spigot into the bell. The jointing element C above described can either be made of annular form, or in the form of a strip that is adapted to be positioned inside of the pipe bell with its ends abutting. The particular cross-sectional shape of said jointing element is immaterial, but I have found that it is preferable to provide it adjacent its rear edge with a portion 3, as shown in Figure 1, that co-operates with the end of the pipe spigot to insure the portion at the inner side of the jointing element moving inwardly towards the rear end of the bell when the spigot is being forced home. At the front edge of the jointing element is a portion 4, which preferably is of greater thickness than the central part of the jointing element located between the inner surface of the bell and the exterior of the spigot. Said portion 4 co-operates with the front edge of the bell to prevent the jointing element from slipping relatively to the bell in the operation of forcing the spigot home and said portion 4 also constitutes a reserve supply for the material that is packed in the annular space between the spigot and the bell when the spigot is forced into the bell.

Figure 2:
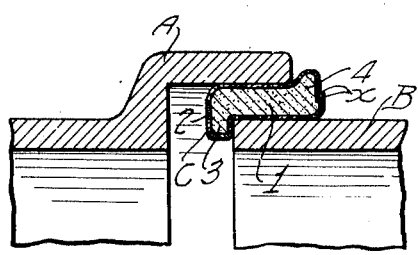
Figures 2 and 3 are sectional views, illustrating the action of rolling the jointing element into the bell.
Figure 3:
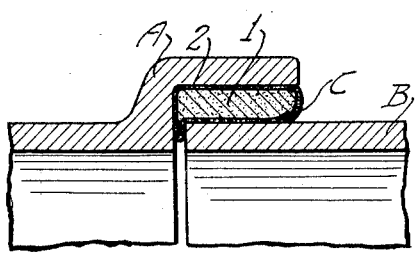

One method that can be used to install my improved jointing element is to arrange said element in the pipe bell A preferably at the front end of said bell with the portion 4 of said jointing element in engagement with the front edge of the bell, as shown in Figure 1, then introduce the spigot B into the jointing element, and thereafter move the spigot longitudinally into the bell, as indicated in Figures 2 and 3. This inward movement or longitudinal movement of the spigot B exerts pressure on the portion of the casing 2 at the inner side of the jointing element in such a way that said casing causes the core of the jointing element to roll rearwardly into the bell and said inward movement of the spigot also causes the portion of the jointing element that is positioned at the rear of the end of the spigot to spread out over the inner surface of the bell. In other words, at the beginning of the operation of rolling the jointing element into the bell the portion 4 of the jointing element bears against the front edge of the bell, and thus in effect causes the jointing element to be anchored to or secured to the inner surface of the pipe bell at a point in advance of the rear end wall of said bell, and the portion 3 at the rear edge of the jointing element against which the end of the spigot B bears acts as an abutment on the jointing element that prevents the spigot B from slipping rearwardly over the jointing element when the spigot is forced home. Consequently, as the outer side of the jointing element is anchored to the bell and the inner side of said jointing element is anchored to the spigot, the inward movement of the spigot exerts an inward pull on the part of the fabric casing 2 that encases the portion 4 of the jointing element, with the result that the plastic or semi-plastic substance inside of said casing is converted into an annular ring that fills the space between the exterior of the spigot and the inner surface of the bell. In the event the pressure that is set up in the casing becomes excessive during the operation of forcing the spigot home, the overlapped end portions $x$ of the casing are free to spread or pull apart sufficiently to prevent rupture of the casing.

From the foregoing it will be seen that while the fabric casing 2 of the jointing element prevents the deformable core of said element from extruding into the barrels of the pipe, and insures said core being packed tightly into the space between the bell and spigot, the action of installing said jointing element is different from the action of installing the jointing element described in my patent previously referred to, in that my present jointing element is rolled into operative position between the bell and spigot by inward pressure exerted on a portion at the inner side of the jointing element while a portion at the outer side of the jointing element is held against longitudinal movement. Moreover, as my present jointing element is provided at its front edge with a portion 4 that is arranged on the outside of the bell at the beginning of the operation of packing the element in the annular space between the bell and spigot, said element readily adapts itself to various sized pipe and also to pipe which are not absolutely uniform as to shape and dimensions. In other words, with a jointing element of the kind herein described, a portion at the front edge of the jointing element will remain on the outside of the bell if the annular space between the bell and spigot is comparatively small, but if said annular space is comparatively large, more or less of the portion of the jointing element just referred to will be pulled rearwardly into said annular space and packed tightly into same.

Figure 4:
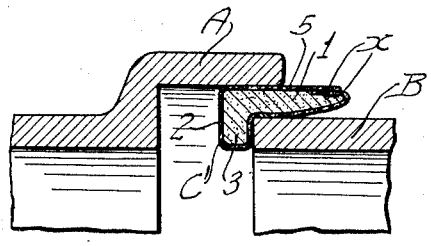
Figure 4 is a sectional view, illustrating a jointing element of slightly different shape than the one shown in Figure 1, arranged in position at the front end of the bell, preparatory to forcing the spigot home.
Figure 5:
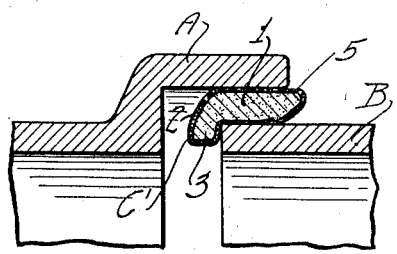
Figures 5 and 6 are sectional views, illustrating the operation of rolling said jointing element into the bell.
Figure 6:
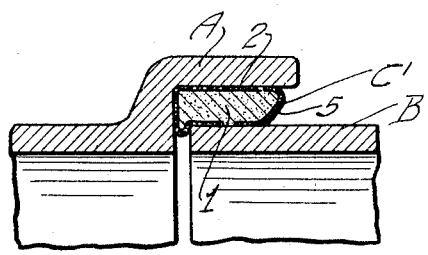

As previously stated, one object of my present invention is to provide a water-proof pipe jointing element that is easy to install, that will pack tightly in the annular space between the spigot and bell and which will be securely connected with the pipe by a water-proof adhesive. I attain these highly desirable results by making the jointing element of such shape and construction that it can be rolled into the annular space between the spigot and bell, as previously described, and provide said element with a water-proof adhesive outer coating that has great adhesive properties. So far as these characteristics of my improved jointing element are concerned, it is immaterial how the body portion of said element is constructed, and the particular shape of said body portion is also immaterial. Figures 4, 5 and 6 of the drawings illustrate a pipe jointing element C' that has the above described characteristics, said element being similar to the jointing element C illustrated in Figures 1, 2 and 3, except that it is provided at its front end with a substantially wedge-shaped portion that projects forwardly beyond the front edge of the bell, and the fabric casing 2 of said element is provided with an adhesive outer coating 5 formed preferably from an asphaltic substance that has greater adhesive properties than the asphaltic substance from which the core is constructed. In the operation of forcing the spigot into the bell, the adhesive coating 5 causes the jointing element to be anchored to the inner surface of the bell, and the pressure which the spigot exerts on the inner side of said element causes it to be rolled into the bell. After said element has been installed, the adhesive outer coating 5 of same insures its adhering tightly to the pipe, due to the fact that said outer coating is formed from a very sticky, water-proof substance.

Having thus described my invention, what I claim as new and desire to secure by Letters Patent is:

1. A jointing element for bell and spigot pipe consisting of a fabric casing filled with a plastic substance of such consistency that the element can be rolled into a pipe bell and packed tightly between the bell and the co-operating spigot by longitudinal pressure exerted on the inner side of the element, and means for preventing said element from slipping relatively to the bell when it is being installed.

2. A pipe jointing element for bell and spigot pipe adapted to be arranged in a pipe bell at a point in advance of the rear end wall of the bell and composed of a fabric outer casing and a plastic core inside of said casing which is of such consistency that it is capable of rolling rearwardly into the space between the spigot and bell when subjected to the pressure that is exerted on same by said casing, and means for preventing portions at the outer and inner sides of said element from slipping relatively to the bell and spigot when the spigot is being forced home.

3. A pipe jointing element for bell and spigot pipe adapted to be arranged in a pipe bell at a point in advance of the rear end wall of the bell and composed of a fabric outer casing and a plastic core inside of said casing which is of such consistency that it is capable of rolling rearwardly into the space between the spigot and bell when subjected to the pressure that is exerted on same by said casing, a shoulder or abutment portion on said element that is adapted to engage the front edge of the bell, and a separate shoulder or abutment portion on said element that is adapted to be engaged by the front end of the pipe spigot in the operation of rolling the element into the bell.

4. A pipe jointing element for bell and spigot pipe constructed so that it is adapted to be arranged at the front end of a pipe bell and then rolled into same by pressure exerted on the inner side of said element by the spigot which is being forced into the bell, and means for preventing said element from slipping relatively to the bell when it is being installed.

5. A pipe jointing element for bell and spigot pipe adapted to be arranged in annular form in the front end of a pipe bell, said element having a portion that contacts with the front edge of the bell, a portion that contacts with the front end of the spigot, and a reduced center part that lies between the bell and spigot at the beginning of the operation of installing said element.

6. A pipe jointing element of annular form or capable of being bent into annular form, provided with a deformable body portion which is of reduced cross section between its front and rear edges.

7. A pipe jointing element of annular form or capable of being bent into annular form, provided with a body portion of reduced cross section between its front and rear edges, composed of a plastic core surrounded by a fabric casing.

WILLIAM C. FERGUSON.